United States Patent [19]

Moss

[11] 4,257,147
[45] Mar. 24, 1981

[54] OVERLOAD CLUTCH FOR THE FEED ROLL OF A CARDING MACHINE

[75] Inventor: Alfred W. Moss, Charlotte, N.C.

[73] Assignee: White Consolidated Industries, Inc., Cleveland, Ohio

[21] Appl. No.: 30,777

[22] Filed: Apr. 17, 1979

[51] Int. Cl.³ .............................................. D01G 15/02
[52] U.S. Cl. ........................................ 19/0.2; 19/0.23; 19/105; 192/56 R; 310/103
[58] Field of Search ......................... 19/0.2, 0.23, 105; 310/103; 192/53 D, 56 R, 84 C

[56] References Cited

U.S. PATENT DOCUMENTS

| | | | |
|---|---|---|---|
| 1,852,494 | 4/1932 | White | 19/0.2 |
| 2,442,333 | 6/1948 | Bacon | 19/105 |
| 2,667,665 | 2/1954 | Gray | 19/105 |
| 3,103,040 | 9/1963 | Duquette | 19/0.2 |
| 3,122,904 | 3/1964 | Brandt | 66/9 |
| 3,240,304 | 3/1966 | Wickersham | 310/103 X |
| 3,391,427 | 7/1968 | Dixon | 19/0.23 |
| 3,411,187 | 11/1968 | Groce et al. | 19/105 |
| 3,418,696 | 12/1968 | Kramolis et al. | 19/105 |
| 3,474,501 | 10/1969 | Jeanmaire | 19/105 |
| 3,503,478 | 3/1970 | Neumann | 192/56 R |
| 3,599,067 | 8/1971 | Wallis | 192/56 R |
| 3,608,691 | 9/1971 | Rosenberg | 192/56 R |
| 3,971,103 | 7/1976 | Ono | 19/0.2 |
| 4,010,832 | 3/1977 | Puro | 192/84 C |

*Primary Examiner*—Louis Rimrodt
*Attorney, Agent, or Firm*—Pearne, Gordon, Sessions, McCoy & Granger

[57] ABSTRACT

An electromagnetically actuated jaw clutch for torsionally driving the feed roll of a carding machine includes a pair of annular, rack-toothed face gears spring biased away from each other in opposed relation to establish a nonengaged position when the clutch is de-energized. Energization of the jaw clutch magnetically forces the annular face gears against each other into an engaged interlocked position for effective driving of the feed roll. A torque overload condition established by jamming of the feed roll causes the rack-toothed face gears to ride out of engagement and separate from each other. Such torque overload separation of the face gears is sensed by a proximity switch which deactivates the clutch electromagnet and selected portions of the carding machine.

11 Claims, 7 Drawing Figures

OVERLOAD CLUTCH FOR THE FEED ROLL OF A CARDING MACHINE

BACKGROUND OF THE INVENTION

The present invention relates in general to textile carding, and more particularly to an electromagnetically actuated torque-sensitive clutch for driving the feed roll of a carding machine.

The jamming of raw, non-carded, textile fibers between the feed roll and its associated feed plate is a well known problem encountered in the textile carding process, such jamming, for example, being caused by double laps of fibers or foreign objects drawn into the carding machine by the feed roll.

One means for minimizing such jamming is to provide a spring-supported feed roll for varying the feed space between the feed roll and its feed plate in accordance with the effective thickness of the raw textile fiber lap passing between the roll and the plate. U.S. Pat. Nos. 2,442,333 and 2,667,665 illustrate such feed rolls of the spring-supported type. While such a spring-supported feed roll may minimize feed roll jamming, the varying distance between the feed roll and its feed plate may permit entry into the carding machine of multiple laps or foreign objects of a size that could damage the carding machine or detract from the quality of the carded fibers.

Where it is desirable to minimize the degree of variance in the feed space between the feed roll and its feed plate to preclude entry of double laps or foreign objects into the carding machine, control means must be provided to respond to jammed feed roll conditions to prevent damage to the carding machine, while minimizing interruptions in the carding process. Such control means, for example, could automatically shut down portions of the card, such as the feed and doffer rolls, to allow manual unjamming of the feed roll while maintaining some of the carding process, such as card cylinder rotation, during such a jammed feed roll condition.

It is known that utilization of electromagnetically actuated clutches as part of the control means for driving feed and doffer rolls permits ready activation and deactivation of such rolls. U.S. Pat. No. 3,418,696 illustrates a carding machine including electromagnetic clutches in the drive trains of the feed and doffer rolls.

SUMMARY OF THE INVENTION

The present invention provides an electromagnetically actuated clutch for driving the feed roll of a carding machine, the clutch including an elongated drive shaft torsionally driven by a first clutch plate which, in turn, is driven by a second clutch plate positively interlocking with the first clutch plate. The clutch plates are biased away from each other to maintain a separated, non-engaged position. An electromagnet, when energized, electromagnetically forces the clutch plates against each other into an engaged, interlocked position. The clutch plates, at a predetermined excess torque value between them, separate from each other against the electromagnetic force applied by the electromagnet. Such excess torque separation of the clutch plates is sensed by a proximity switch positioned adjacent the clutch plates. The proximity switch, upon sensing the separation of the clutch plates while the electromagnet is energized, provides a signal which can be utilized, for example, to deactivate the clutch electromagnet and the driving of the doffer roll of the carding machine. Preferably, the feed roll of the carding machine is torsionally driven for rotation via an electromagnetically actuated jaw clutch having a pair of identical interlocking, annular face gears carried by opposed driving and driven clutch plates coaxially mounted relative to the center spindle or drive shaft of the feed roll. The driving clutch plate is rotationally mounted on and axially movable along the feed roll drive shaft axis of rotation, while the driven clutch plate is fixed to the feed roll drive shaft for imparting torsional force thereto. With the electromagnetically actuated jaw clutch in an unenergized condition, the driving clutch plate is spring-biased axially away from the opposed driven clutch plate wherein the face gears of the clutch plates are in a non-engaged separated condition, thus permitting free rotation of the driving clutch plate apart from the driven clutch plate. Energization of the jaw clutch magnetically forces the spring-biased driving clutch plate against the driven clutch plate wherein the respective face gears interlock to form a positive coupling between the driving and driven clutch plates. At a predetermined feed roll torque overload condition, the face gear carried by the driving clutch plate rides out of engagement with the opposed face gear carried by the driven clutch plate, such disengagement causing axial movement of the driving clutch plate away from the driven clutch plate. Separation of the mechanically disengaging clutch plates while the electromagnet of the clutch is energized is sensed by a proximity detector which senses axial movement of the driving clutch plate. The proximity detector provides a feed roll torque overload control signal which is utilized to terminate rotational driving of the feed and doffer roll apart from the rotating card cylinder.

DETAILED DESCRIPTION OF THE PREFERRED EMBODIMENT

Figure 1:
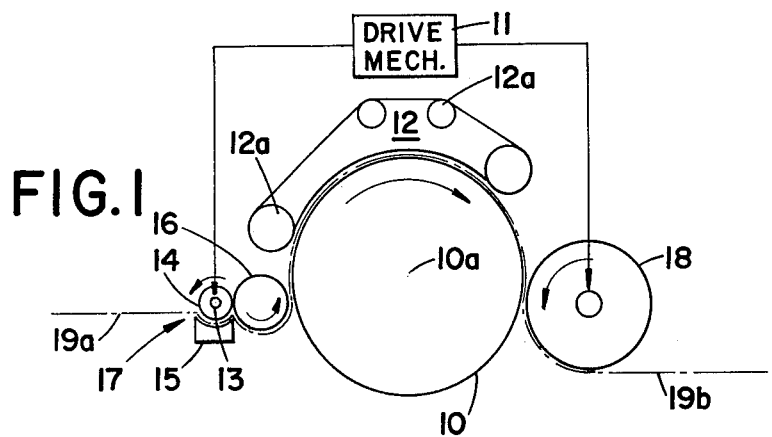
FIG. 1 schematically illustrates a textile carding machine having a feed roll adapted for driving via an electromagnetically actuated clutch in accordance with the present invention.

Turning to FIG. 1, there is illustrated a textile fiber carding machine having a relatively large rotating card cylinder 10, its upper periphery being engageable with a moving train of flats 12 for fiber carding in a conventional manner. The card cylinder 10 is journaled on a central axis of rotation 10a. Rotative forces are imparted to the card cylinder 10 by a conventional card cylinder drive mechanism (not shown). The flats 12 are driven for movement on rollers 12a by a flat driving mechanism of a conventional type (not shown).

Raw, non-carded textile fibers are provided to the outer periphery of the card cylinder 10 via a conventional feed roll 14 and a lickerin roll 16, while the carded textile fibers are stripped from the periphery of the card cylinder 10 by a conventional doffer roller 18. Typically, a common drive mechanism 11 of a suitable type, such as a belt or chain drive mechanism, is used to rotate the feed roll 14 and the doffer roll 18, wherein interruption of the carding process can be brought about simply by deactivating rotational drive of the smaller feed roller 14 and doffer roller 18, while maintaining rotation of the much larger card cylinder 10, which develops considerable inertia, such inertia undesirably precluding fast starting and stopping of card cylinder rotation. It is noted that the lickerin roller 16 may be independently driven via a separate drive mechanism.

Raw, non-carded, fibrous material is initially fed along path 19a to a feed space 17 established between the lower periphery of the feed roll 14 and an associated feed plate 15 spaced a predetermined distance downwardly therefrom. The fibrous material is metered to a peripheral, fiber-entraining surface of the lickerin roll 16 by rotation of the feed roll 14. The lickerin roll 16 transfers, in a conventional manner, a predetermined amount of raw, non-carded fiber material from the feed space 17 to the periphery of the moving card cylinder 10. A portion of the carded fibers is continuously transferred from the periphery of the card cylinder 10 by the stripping action of the doffer roll 18 to provide a strand or silver of carded fibers along path 19b. The carding process and the interaction of the feed roll 14, lickerin roll 16, card cylinder 10, flats 12, and doffer roll 18, as explained above, are conventional in nature and well-known in the art.

Figure 2:
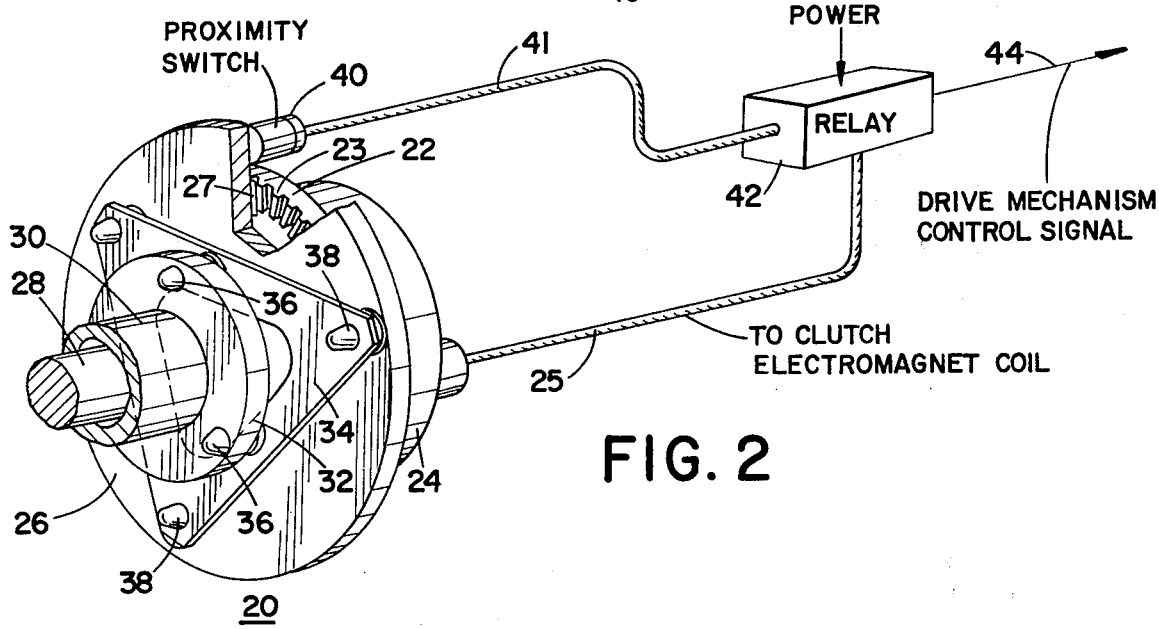
FIG. 2 is a perspective view of a clutch in accordance with the invention, with portions cut away.

As illustrated in FIG. 1, the feed roll 14 is torsionally driven by rotation of a center spindle or feed roll drive shaft 13, which is engaged to the drive mechanism 11 via an electromagnetically actuated, torque-sensitive clutch as illustrated in FIG. 2.

In FIG. 2, the electromagnetically actuated torque-sensitive clutch 20 includes a clutch drive shaft 28 lying along the axis of rotation of the feed roll 14 and rotatable thereon. The clutch drive shaft 28 is rigidly fixed to and functions as an extension of the center spindle or drive shaft 13 of the feed roll 14, the exact relationship of the clutch drive shaft 28 and feed roll drive shaft 13 to be subsequently illustrated with regard to FIG. 6. The clutch 20 includes a first or driven clutch plate 22, annular in shape, the diametrical extent of the annular driven clutch plate 22 lying in a plane perpendicular to the axis of rotation of the clutch drive shaft 28 and fixed relative thereto for concurrent rotation with the shaft 28, the center of the annular driven clutch plate 22 lying on the axis of rotation of the feed roll 14.

A second or driving clutch plate 26, annular in shape, is positioned directly opposite to the driven clutch plate 22, the pair of clutch plates 22, 26 being parallel to each other, the driving clutch plate 26 also lying in a plane perpendicular to the axis of rotation of the feed roll 14, the center of the annular driving clutch plate 26 lying on the axis of rotation of the feed roll 14.

In a preferred form, the clutch plates 22, 26 carry or integrally include a respective pair of opposed rack-toothed face gears 23, 27 in face-to-face relation which positively interlock with each other for torsional driving when the clutch is energized in a manner to be subsequently illustrated. With the clutch 20 in an unenergized condition, the driving clutch plate 26 is held away from or biased in spaced relation from the driven clutch plate 22 by means of a flat, open-center, triangular spring-biasing member, preferably of spring steel or the like, which solely supports the driving clutch plate 26 relative to the clutch drive shaft 28. The driving clutch plate 26 is fastened by appropriate circumferentially spaced rivets 38 to the three corners of the triangular spring-biasing member 34, as illustrated. The spring-biasing member 34, in turn, is fastened by three rivets 36 (only two shown) located at the three midpoints of the three leg portions of the triangle member 34 to a radially extending flange 32 of an axially fixed, rotatable collar 30. The clutch drive shaft 28, the driven clutch plate 22, and the feed roll drive shaft or center spindle 13 rotate together in a unitary fashion for effective torsional driving of the feed roll 14 which, preferably, is fixed to its center spindle 13 for rotation.

The driving clutch plate 26, when the clutch is in an unenergized condition, freely rotates on the longitudinal axis provided by the clutch drive shaft 28. While the rotatable collar 30 is axially fixed at a point on the drive shaft 28, the spring-biased driving clutch plate 26 can, by applying appropriate axially directed forces, be shifted to a limited degree axially toward the axially fixed driven clutch plate 22 for positive interlocking engagement of the opposed face gears 23, 27. Such forced axial movement of the spring-biased driving clutch plate 26 toward and into engagement with the driven clutch plate 22 is provided by an annular electromagnet 24 positioned adjacent and parallel to the driven clutch plate 22, such driven clutch plate 22 being interposed between the driving clutch plate 26 and the electromagnet 24 in a manner to be subsequently illustrated. When a clutch electromagnet power input 25 is energized, a strong magnetic attraction force radiated by the electromagnet 24 pulls and electromagnetically forces the clutch plate 26 against and into engagement with the driven clutch plate 22, with resulting coupling of the face gears 23, 27 when proper tooth alignment is established. It can be seen that energization of the electromagnet 24 and subsequent engagement of the clutch plates 22, 26 permits a torsional driving force to be transferred from the driving clutch plate 26 to the driven clutch plate 22 for rotation of the feed roll 14. Conversely, with the electromagnet 24 not energized, the spring-biased driving clutch plate 26 is held away from the driven clutch plate 22 in spaced relation for free rotation on the clutch drive shaft 28 apart from the driving clutch plate 26.

In further accordance with the present invention, a proximity switch 40 of, for example, the magnetic reed switch or semiconductor type, is located adjacent the clutch plates 26, 22 to sense movement of the clutch plate 26 to and from the driven clutch plate 22, in a manner to be subsequently discussed in more detail.

With the electromagnet 24 energized and the driving clutch plate face gear 27 in interlocking engagement with the driven clutch plate face gear 23, the feed roll 14 will be driven via the clutch plates 22, 26 at a torque value less than an excess torque value experienced on jamming of double laps of fibrous material or oversized foreign objects between the feed roll 14 and the feed plate 15, as illustrated and discussed with respect to FIG. 1. Upon partial or complete jamming of the feed roll 14, wherein a predetermined excess torque value is established between the driving and driven clutch plates 26, 22, the clutch plates begin to separate, with the face gear 27 riding away from the face gear 23. Such excess torque separation of the clutch plates 26, 22 is sensed by the proximity switch 40, which trips a conventional relay 44 via a control signal line 41, tripping of the relay 42 deenergizing the electromagnetic magnet 24 and generating a drive mechanism control signal 44 which, for example, can be utilized to deenergize the drive mechanism 11 as illustrated in FIG. 1 to stop rotation not only of the feed roll 14 but also of the doffer roll 18 while rotation of the card cylinder 10 can be maintained.

Figure 3:
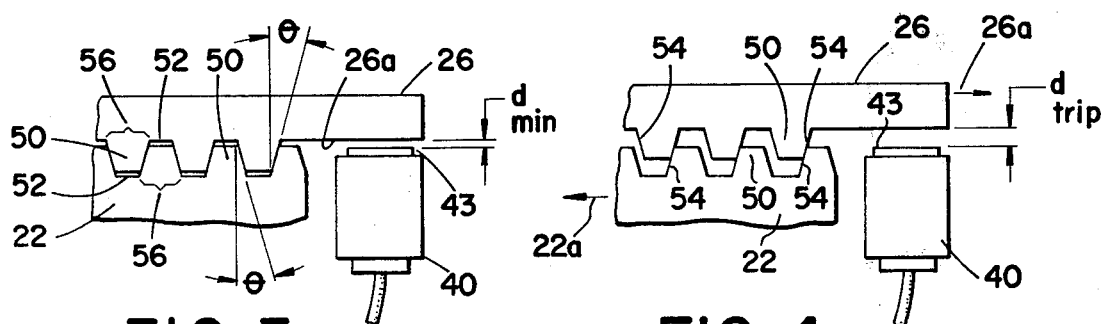
FIG. 3 is a cross section view of the toothed surfaces of interlocking face gears carried by a pair of clutch plates in accordance with the invention, the toothed surfaces being interlocked in a fully engaged position.
Figure 4:
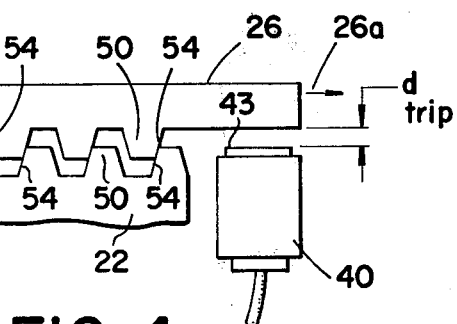
FIG. 4 is a cross section view of the toothed surfaces illustrated in FIG. 3, wherein such surfaces are partially disengaged from each other as a result of a torque overload condition.
Figure 5:
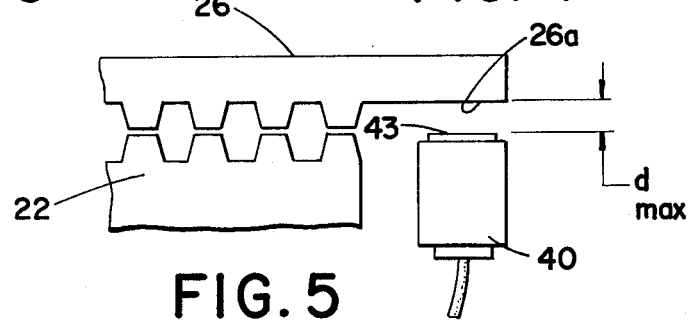
FIG. 5 illustrates the toothed surfaces of the face gear carrying clutch plates separated from each other in a spring-biased condition wherein the electromagnet of the clutch is deenergized.

With reference to FIGS. 3 through 5, the torque overload separation of the face gears 27, 23 carried by the clutch plates 26, 22 is illustrated. In FIG. 3, the clutch plates 22, 26 are shown in their fully engaged position wherein the teeth 50 of the face gears 23, 27 positively engage and interlock in mating relation wherein the minimum distance $d_{min}$ between a detecting face 43 of the proximity switch 40 and the inner peripheral surface 26a of the driving clutch plate 26 is established. The radially extending teeth 50 of the face gears 23, 27 have flat crests 52 and are tapered in cross section with their base portions 56 greater than the width of the flat crests 52. The angles $\theta$ of the tooth sidewalls 54 are approximately equal. FIG. 3 illustrates the normal condition of the interlocked clutch plates 22, 26 when the electromagnet 24 is energized and the feed roll 14 is not experiencing a jamming condition wherein excess torsional force would be applied.

Turning to FIG. 4, there is illustrated a dynamic condition resulting from feed roll jamming, wherein excess torque develops between the spring-biased driving clutch plate 26 and the driven clutch plate 22. With such an excess torque condition being established, wherein excess torsion is being applied by the clutch plate 26, as indicated by arrow 26a, and wherein opposed resisting force 22a results from the jammed feed roll 14, the tooth sides 54 act as respective ramps with the teeth 50 riding out of interlocking engagement and the plate 26 moving a predetermined trip distance $d_{trip}$ away from the sensing surface 43 of the proximity switch 40. Upon such trip distance being established, the proximity switch 40 provides the earlier-noted control signal which activates the relay 42 to terminate energization of the electromagnet 24 and, via the drive mechanism control signal 44, deenergizes rotation of the feed and doffer cylinders 14, 18. Preferably the control signal 44 is generated by the proximity switch 40 prior to maximum separation (greater than $d_{trip}$) of the clutch plates 26, 22 at the excess torque value.

Turning to FIG. 5, the clutch plates 22, 26 are shown in their normal position with the electromagnet 24 deenergized, wherein maximum distance $d_{max}$ is provided between the sensing surface 43 of the proximity switch 40 and the peripheral surface 26a of the clutch plate 26. It can be seen that the teeth of the face gear carried by the driving clutch plate 26 are spaced from and out of interlocking engagement with the face gear of driven clutch plate 22 (as illustrated in FIG. 4), thus precluding torsional driving of the feed roll 14.

Figure 6:
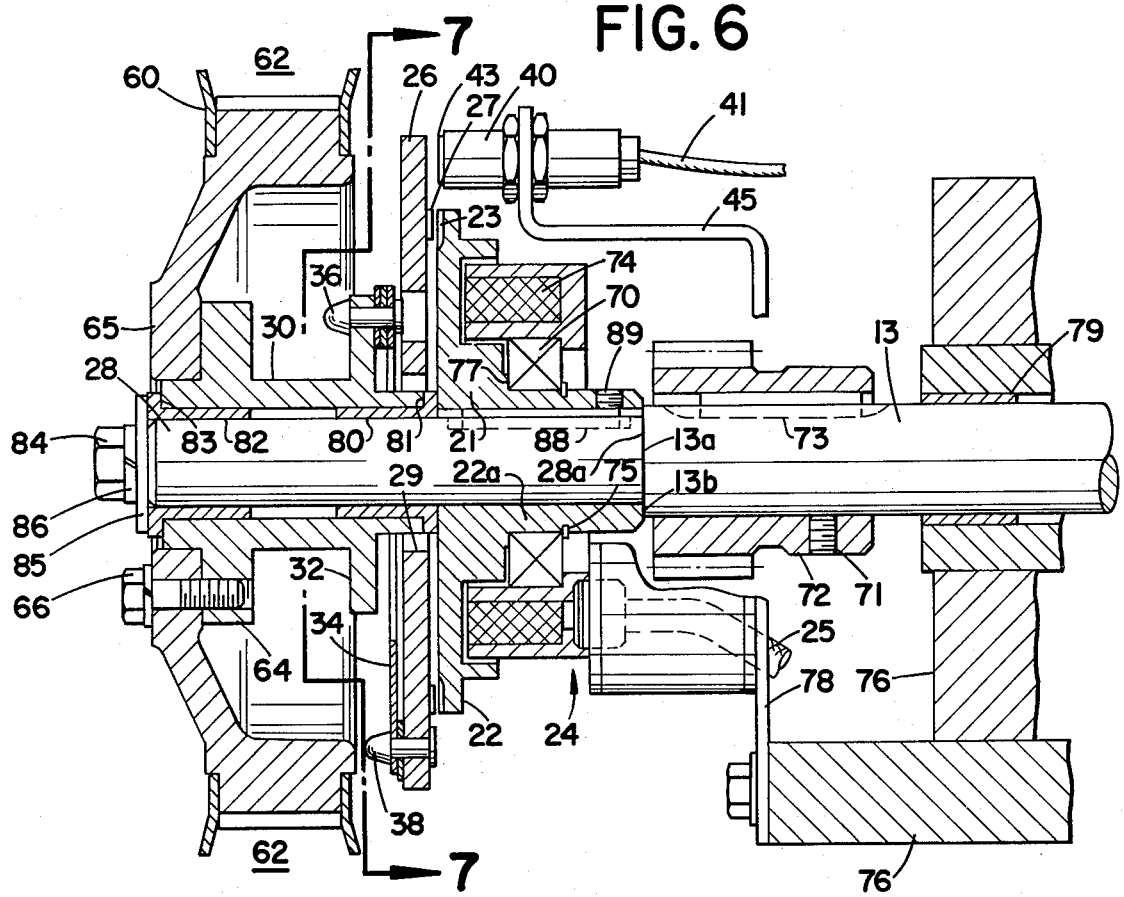
FIG. 6 is a longitudinal cross section elevational view of the electromagnetically actuated clutch of the present invention mounted for driving of a card cylinder feed roll.

Turning to FIG. 6, there is illustrated in detail a preferred embodiment of an electromagnetically actuated jaw clutch for use in accordance with the invention in an installed position relative to the feed roll of a carding machine.

Frame members 76 of the carding machine support a bearing 79 for journaling one end of the feed roll drive shaft or center spindle 13. The machine frame members 76 also support an electromagnet support bracket 78 whose upward end extends to provide a proximity switch support bracket 45. A gear drive sprocket 72 is fixed axially and rotationally to the feed roll drive shaft 13 outboard of the bearing 79 by a key 73 and a setscrew 71, the drive sprocket 72 being utilized to actuate conventional auxiliary fiber handling rollers of the carding machine.

The clutch drive shaft 28 and the feed roll drive shaft 13 lie along and rotate on a common longitudinal axis which also defines the axis of rotation of the feed roll 14 illustrated in FIG. 1. The abutting ends 28a, 13a of the clutch drive shaft 28 and the feed roll drive shaft 13 are rigidly joined or unitarily formed. Preferably, the shafts 13, 28 are integrally formed in a single piece, with the shaft portion comprising shaft 28 being turned down to a reduced diameter relative to the shaft portion comprising shaft 13. The electromagnet 24, which includes an annular coil portion 74 extending around the clutch drive shaft 28 and coaxially mounted thereto, is supported in fixed relation relative to the carding machine frame 76 by the support bracket 78. The annular electromagnet coil portion is of a conventional design for providing an electromagnetic field disposed generally symmetrically about the drive shaft longitudinal axis, the field radiating toward the driving clutch plate 26.

The electromagnet 24 is also supported at its inner periphery by a ring bearing 70 which is interposed between the rotationally fixed electromagnet 24 and an axially extending, cylindrical, mounting collar 22a of the rotatable driven clutch plate 22. The driven clutch plate mounting collar 22a axially abuts a shoulder 13b provided by the outboard end of the feed roll drive shaft 13 and is locked in place on the clutch drive shaft 28 by a key 88 and setscrew 89. The ring bearing 70 is held in place axially by being clamped between a driven clutch plate shoulder 77 and an annular, spring-like lock ring 75 received in an appropriate circumferentially extending slot in the collar 22a. With the clutch in a deenergized or deactuated condition, the driven clutch plate 22, which carries the rack-toothed face gear 23, rotates with the clutch drive shaft 28, the feed roll drive shaft 13, and the feed roll 14, such rotation being apart from the rotationally fixed electromagnet 24 and the rotatable driving clutch plate 26.

Mounted to the free end of the drive shaft 28 and rotationally supported thereon is the axially fixed, rotatable collar 30 which rides on a pair of bushings in the form of an inner sleeve bushing 80 and an outer sleeve bushing 82. The inner sleeve bushing 80, having a radially outwardly extending inboard flange 81 abutting the inner diameter area 21 of the driven clutch plate 22, provides support for the inboard end of the axially fixed rotatable collar 30, while the sleeve 82, having an outboard radially extending shoulder 83, supports the outboard end of the rotatable collar 30. An axially aligned drive shaft bolt 84, with lock washer 86 and flat washer 85, axially holds the sleeve flange 83 against the collar 30, which in turn is held against the sleeve flange 81, the sleeve flange 81 in turn being axially held against the fixed driven clutch plate collar 22a. It can be seen that the collar 30 is free to rotate on the bearing surfaces provided by the bushings 80, 82, but is generally fixed axially on the shaft 28. Rotational driving of the collar 30 is provided by a conventional drive pulley 60 having a belt receiving peripheral area 62 and an inner mounting portion 65 fastened via appropriate bolts 66 to an outboard pulley mounting flange 64 of the rotatable collar 30.

With appropriate belt driving of the drive pulley 60 (e.g., via drive mechanism 11 of FIG. 1), the axially fixed collar 30 can rotate apart from the rotatable drive shaft 28.

As earlier discussed with regard to FIG. 2, a radially extending clutch mounting flange 32, to which the spring-biasing member 34 is riveted via appropriate rivets 36, supports the driving clutch plate 26 in parallel, opposed relation to the driven clutch plate 22. While the rotatable collar 30 is axially fixed, the spring member 34 formed of appropriate spring-type sheet steel permits limited axial movement of the driving clutch plate 26, wherein energization of the electromagnet coil 74 axially pulls the driving clutch plate 26 toward the driven clutch plate 22 wherein an interlocking of the face gears 27, 23 provides a positive coupling between the pulley 60 and the feed roll drive shaft 13, which torsionally drives the feed roll 14.

Upon the jamming of the feed roll 14, as explained earlier, an overload torque condition is established wherein rotation of the feed roll drive shaft 13 is resisted, the face gears 27, 23 separating as illustrated in FIG. 4. The proximity switch 40 deenergizes the electromagnet coil 74, wherein the driving clutch plate 26 springs axially away from the driven clutch plate 22 to its deenergized position, as illustrated in FIG. 6. The drive pulley 60 is thus disengaged from applying torsional driving to the jammed feed roll 14 via the feed roll drive shaft 13. It can be seen that the electromagnetically actuated clutch of the present invention advantageously provides fast-acting deactuation and actuation of the feed roll from the carding machine drive mechanism, while providing means for detecting a jamming feed roll condition as a function of excessive torque, such excessive torque being evidenced by mechanical movement sensed by a proximity detector providing a signal for selectively deenergizing portions of the carding machine to preclude damage thereto.

Figure 7:
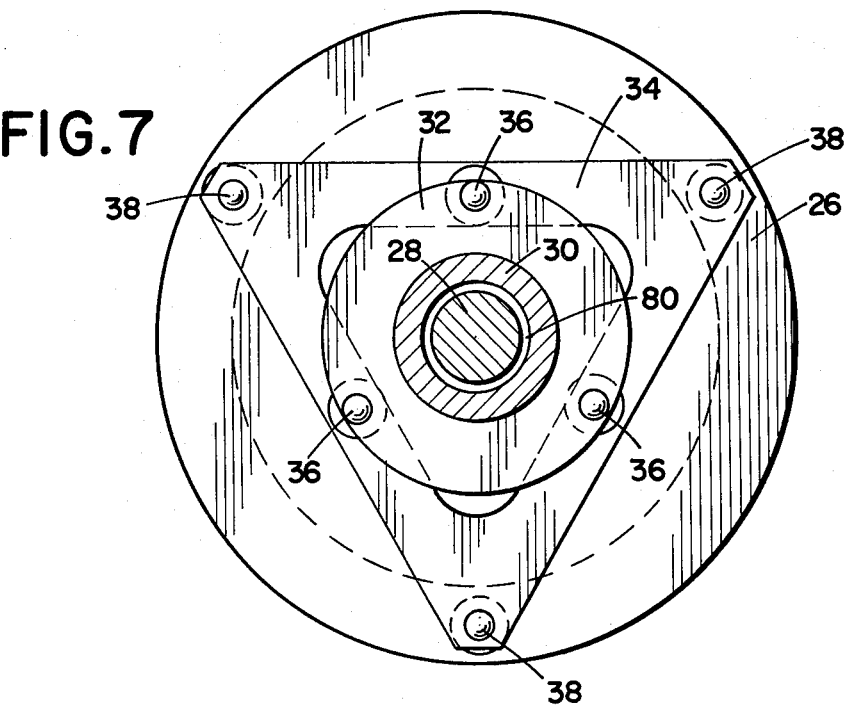
FIG. 7 is a sectional view of a spring-mounted driving clutch plate in accordance with the invention, taken along line 7—7 of FIG. 6.

In FIG. 7, the mounting of the axially movable driving clutch plate 26 having its inner diameter 29 (see FIG. 6) spaced from the rotating collar 30 is illustrated. The three midpoints of the three legs of the open-center, triangular spring-biasing member 34 are fixed rigidly to the clutch mounting flange 32, while the three corners of the triangular spring-biasing member 34 are fixed at equidistantly circumferentially spaced peripheral points of the driving clutch plate 26 by rivets 38. It has been found that such an arrangement advantageously permits the needed limited axial movement of the clutch plate 26 for engagement and disengagement with the driven clutch plate 23, while still providing adequate strength for applying appropriate forces to torsionally drive the feed roll 14.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An electromagnetically actuated clutch for driving the feed roll of a carding machine, comprising:
    an elongated drive shaft rotational on its longitudinal axis;
    a driven clutch plate fixed to the drive shaft for torsionally driving the drive shaft;
    a driving clutch plate movable toward the driven clutch plate to positively interlock with the driven clutch plate and torsionally drive the driven clutch plate;
    spring-biasing means providing a biasing force for holding the driving clutch plate in spaced relation away from and out of interlocking engagement with the driven clutch plate;
    an electromagnet positioned adjacent the driven clutch plate, the driven clutch plate being located between the driving clutch plate and the electromagnet, the electromagnet, when energized, electromagnetically pulling the driving clutch plate against the driven clutch plate into interlocking engagement, the driving clutch plate being movable away from the driven clutch plate against the electromagnetic force wherein the driving clutch plate rides out of engagement with the driven clutch plate at a predetermined excess torque value between the driving and driven clutch plates; and
    a proximity switch positioned to sense the movement of the driving clutch plate away from and out of engagement with the driven clutch plate at the predetermined excess torque value attained while the electromagnet is energized.

2. A clutch according to claim 1, wherein the electromagnet is annular, with the drive shaft longitudinal axis extending through the center thereof.

3. A clutch according to claim 2, wherein the electromagnetic field provided by the energized electromagnet is disposed generally symmetrically about the drive shaft longitudinal axis.

4. An electromagnetically actuated clutch for driving the feed roll of a carding machine, comprising:
    an elongated drive shaft rotatable on its longitudinal axis;
    a pair of annular face gears having toothed surfaces opposed to each other in parallel relation, the face gears lying in planes perpendicular to the axis of rotation of the drive shaft, the face gears being rotatable on the axis of rotation of the drive shaft, one of the face gears being fixed to the drive shaft for torsionally driving the drive shaft, the other face gear being rotational apart from the drive shaft and movable to and from the fixed face gear, the annular face gears being biased away from each other to maintain a separated, non-engaged position;
    electromagnet means for forcing the toothed surfaces against each other in positively interlocking engagement, the toothed surfaces riding out of engagement and separating from each other at a predetermined excess torque condition occurring between the toothed surfaces while the electromagnet means is energized; and
    proximity switch means positioned adjacent the toothed surfaces of the face gears for detecting separation of the toothed surfaces at the predetermined excess torque condition, the proximity switch means providing a control signal indicative of such separation of the toothed surfaces.

5. A clutch according to claim 4, wherein the toothed surfaces include a plurality of flat-crested teeth extending radially from the center of the annular face gears.

6. A clutch according to claim 5, wherein the teeth are tapered in cross section each having a base wider than its flat crest.

7. In a carding machine having a card cylinder, a series of moving flats engageable with the periphery of the card cylinder, a feed roll for supplying the card cylinder with fibrous material to be carded, a doffer roll for stripping carded fibrous material from the card cylinder, and a carding machine drive mechanism for synchronously rotating the card cylinder and the feed and doffer rolls, an electromagnetically actuated clutch for connecting the feed roll to the drive mechanism comprising:

an elongated drive shaft rotational on its longitudinal axis coincident with the axis of rotation of the feed roll, the drive shaft being connected to the feed roll for torsionally driving the feed roll;

at least first and second clutch plates, the first clutch plate being connected to the drive shaft for torsionally driving the drive shaft, the second clutch plate being constructed and arranged for positive interlocking with the first clutch plate to torsionally drive the first clutch plate, the second clutch plate being connected to the carding machine drive mechanism;

biasing means connected to at least one of the clutch plates, the biasing means providing a biasing force for holding the clutch plates in spaced apart relation out of interlocking engagement with each other;

an electromagnet constructed and arranged to electromagnetically force the bias-separated clutch plates against each other into interlocking engagement when the electromagnet is energized, at least one of the clutch plates being movable away from the other at a predetermined excess torque value between the plates occurring while the electromagnet is energized; and a proximity switch positioned to detect the separation movement of the clutch plates at the predetermined excess torque value, the proximity switch, upon detecting such separation movement of the clutch plates, providing a control signal, the control signal deenergizing the electromagnet to disconnect the feed roll from the carding machine drive mechanism.

8. A carding machine according to claim 7, wherein the first clutch plate is fixed to the drive shaft, the drive shaft being fixed to the feed roll, the first clutch plate, the drive shaft, and the feed roll being rotationally fixed relative to each other and being rotational on a common axis of rotation.

9. A carding machine according to claim 8, wherein the second clutch plate is rotational apart from the first clutch plate, drive shaft, and feed roll when the electromagnet is deenergized, the second clutch plate being rotatable on the axis of rotation of the first clutch plate, and drive shaft, and the feed roll.

10. A carding machine according to claim 7, wherein said control signal disconnects the doffer roll from the carding machine drive mechanism concurrently with disconnecting the feed roll from the carding machine drive mechanism.

11. A carding machine according to claim 7, wherein the proximity switch generates the control signal prior to maximum separation of the clutch plates at the excess torque value.

* * * * *